United States Patent [19]

Desai et al.

[11] Patent Number: 5,589,213
[45] Date of Patent: Dec. 31, 1996

[54] DUAL-STAGE PROCESS FOR MANUFACTURING POTATO CHIPS

[75] Inventors: Pravin M. Desai, Carrollton; Michael L. Pfeiffer; Mary M. Pohlmeier, both of Dallas; Jennifer B. Raymond, Plano, all of Tex.

[73] Assignee: Recot, Inc., Pleasanton, Calif.

[21] Appl. No.: 418,306

[22] Filed: Apr. 7, 1995

[51] Int. Cl.⁶ .................................................. A23L 1/217
[52] U.S. Cl. .................. 426/438; 426/441; 426/509; 426/510; 426/637; 426/808
[58] Field of Search .................. 426/438, 441, 426/637, 808, 509, 510, 524

[56] References Cited

U.S. PATENT DOCUMENTS

| | | |
|---|---|---|
| Re. 23,890 | 11/1954 | Chase . |
| 2,101,506 | 12/1937 | Morrow et al. ............ 426/441 |
| 2,597,066 | 5/1952 | Chase . |
| 2,983,619 | 5/1961 | Shaw, Jr. et al. . |
| 3,050,404 | 8/1962 | Traisman . |
| 3,397,993 | 8/1968 | Strong . |
| 3,649,305 | 3/1972 | Wilder . |
| 3,660,113 | 5/1972 | Ng . |
| 4,194,016 | 3/1980 | Weaver et al. ............ 426/419 |
| 4,254,153 | 3/1981 | Ross et al. ............ 426/441 |
| 4,277,510 | 7/1981 | Wicklund et al. ............ 426/438 X |
| 4,590,080 | 5/1986 | Pinegar ............ 426/441 |
| 4,632,638 | 12/1986 | Doenges ............ 426/441 |
| 4,761,294 | 8/1988 | Hamann et al. ............ 426/438 |
| 4,900,576 | 2/1990 | Bonnett et al. ............ 426/438 |
| 5,206,048 | 4/1993 | Shin et al. ............ 426/637 |
| 5,279,840 | 1/1994 | Baisier et al. ............ 426/102 |
| 5,302,410 | 4/1994 | Calder et al. ............ 426/637 |

FOREIGN PATENT DOCUMENTS

| | | | |
|---|---|---|---|
| 244526 | 10/1962 | Australia ............ | 426/637 |
| 3814587 | 11/1989 | Germany ............ | 426/438 |
| 61-31061 | 2/1986 | Japan ............ | 426/637 |
| 1-218543 | 8/1989 | Japan ............ | 426/637 |
| 1-273540 | 11/1989 | Japan ............ | 426/637 |
| 1506166 | 4/1978 | United Kingdom ............ | 426/637 |

OTHER PUBLICATIONS

Kulkarni et al., "Crisp Quality of Two Potato Varieties: Effects of Dehydration and Rehydration", Journal of Scientific Food Agriculture, 1994, vol. 64, pp. 205–210.

*Primary Examiner*—Arthur L. Corbin
*Attorney, Agent, or Firm*—Jones, Day, Reavis & Pogue

[57] ABSTRACT

A dual-stage process for preparing potato chips having a centralized first stage continuous process for preparing potato slices for indefinite storage and a second stage continuous process for preparing potato chips for consumer use.

30 Claims, 1 Drawing Sheet

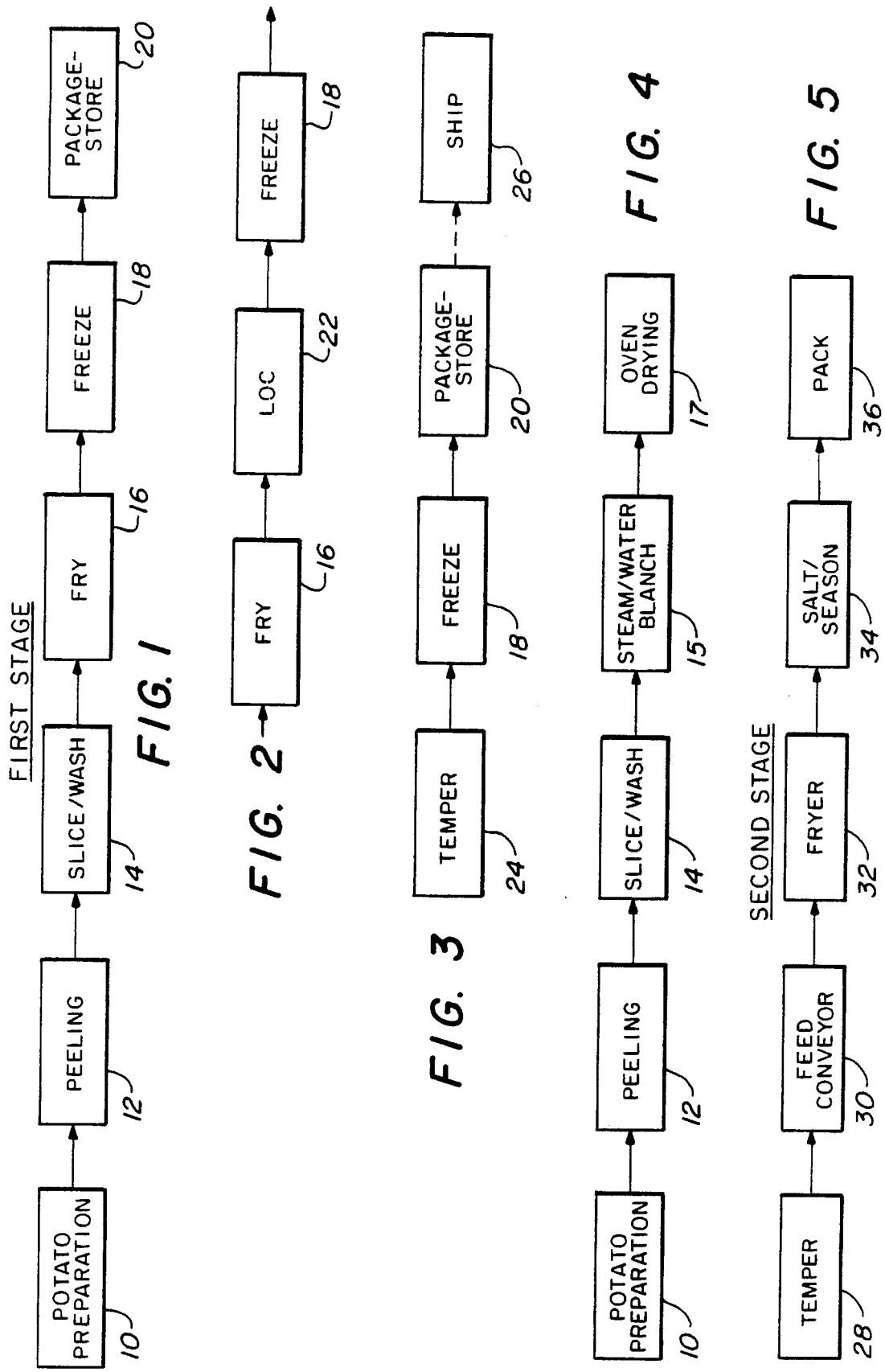

DUAL-STAGE PROCESS FOR MANUFACTURING POTATO CHIPS

BACKGROUND OF THE INVENTION

1. Field of the Invention

The present invention relates to a process for manufacturing potato chips in general and in particular to a dual-stage process for manufacturing potato chips in which, in the first continuous process stage, the potatoes are peeled, sliced, washed, partially fried until the slices have a desired moisture content, then frozen, and stored until ready for use. Alternatively, the potatoes are peeled, sliced, washed, steam or water blanched, partially dried until the slices have a desired moisture content, then frozen, and stored until ready for use. The second stage is also a continuous process for preparing potato chips for commercial use at any one of the plurality of locations. The frozen potato slices are finished fried, salted, and packed for commercial use.

2. Description of Related Art

It is well known in the art to prepare french fry potatoes in two stages; in the first stage, preparing and freezing the french fries and, then in the second stage, frying the french flies to the proper state for the immediate sale and use. For instance, U.S. Pat. No. 3,050,404 discloses a method for preparing frozen french fry potatoes. The frozen potatoes have a high moisture content between about 41% and 54%. In this process, the potatoes are cut into french fry strips, the strips are washed after cutting to remove free starch and then are immersed in cooking fat, having a temperature of approximately 149° C. (300° F.). The strips are held in the fat for the amount of time necessary to decrease their moisture content to a level between 41% and 54%. They are then taken from the fat, drained to allow any excess fat to run off, cooled to room temperature, placed in a moisture-proof package, and then frozen. The strips can be held in a frozen state indefinitely for frying at a later time.

U.S. Pat. No. 5,279,840 discloses a method of making reduced fat deep-fried potatoes. The method includes coating the potato slices with a mixture of ungelatinized amylose and calcium, then blanching, partially drying to obtain only about a 5 to 30% total weight loss, parfrying, freezing, and finish frying the slices. The partially dried pieces are parfried for "from about 15 to 60 seconds at a temperature of about 149° C. (3000° F.) to about 190° C. (375° F.)" and then frozen thereafter.

U.S. Pat. No. 4,590,080 discloses a process for preparing parfried and frozen french flies. Potato strips are blanched, parfried, blast frozen, parfried again, and frozen again. The twice parfried and frozen potatoes all had a moisture content of greater than 43%.

U.S. Pat. No. 4,194,016 discloses a process for preparing precooked fruits and vegetables. The specification teaches that potatoes may be peeled, cut, cooked in water or steamed, heated in dry air "such that no part of the potato tissue is lower than 68% moisture", chilled, thin-sliced, frozen, and then fried in oil.

U.S. Pat. No. 3,649,305 discloses a process for preparing frozen french fry potato segments. Potato strips are dehydrated to lose about 10 to 30%, preferably 20%, of their original weight, blanched, parfried, and frozen. Parfrying is carried out for about 30 to 90 seconds in oil at about 149° C. to about 205° C. (about 300° F. to 400° F.).

U.S. Pat. No. 3,397,993 discloses a process for preparing frozen french fry potatoes. Potato strips are blanched, dehydrated by heated air to about 70–80% of their initial weight, partially fried, and then frozen. A potato strip dried to 70% of its original weight would still contain at least about 50–55% moisture. Following dehydration, "the partially dehydrated strips are immersed in a deep fat fryer for a short period of time, for example from about 15 to about 60 seconds at a fat temperature of from about 149° C. to about 1900° C. (about 300° F. to about 375° F.) during which time the moisture content is still further reduced and during which time the strips are partially fried. The strips are then frozen."

U.S. Pat. No. 3,050,404 discloses a method for preparing a frozen partially cooked french fry potato product. The method comprises parfrying the potato pieces until the moisture content is between 41% and 54%. The patentee states that, "It is not practical to cook to a moisture content level substantially less than 41% since the product, in subsequent finishing, is apt to become excessively firm." The specification teaches that the frozen potato strips can be held frozen indefinitely after which cooking is completed by the consumer.

U.S. Pat. No. 2,983,619 discloses a method of preparing preserved potato products. The method is directed to the preparation of "either small whole potatoes, balls, or cut pieces such as cubes, sticks, slices" and so forth. Thin slices as for potato chips, are not specifically disclosed. Potato pieces are partially cooked, and partially dried to a moisture content of 40–68%. The specification teaches that no part of the potato should have more than 68% or less than 40% moisture prior to freezing.

U.S. Pat. No. 2,597,066 discloses a process for preparing and preserving frozen potatoes, typically for french fries and hash brown products. The patent was reissued as Re. 23,890. Cut potatoes are steamed blanched, partially dehydrated to contain 10–15% less moisture than untreated potatoes, chilled, and frozen. Dehydration is performed with an air cooler and heat is not applied during the dehydration step.

In an article in the Journal of Scientific Food AGRIC, 1994, pages 205–210, entitled "Crisp Quality of Two Potato Varieties: Effects of Dehydration and Rehydration", by Kulkarni et al., potato crisps were prepared. The potatoes were washed thoroughly and hand peeled using stainless steel peelers. An automatic electric slicer was used to slice the potatoes to a uniform thickness of less than 1 mm. Crisps were prepared immediately by dipping the slices for two minutes in a thermostatic fryer using sunflower oil at 180° C. (356° F.). One lot of potatoes was processed into dehydrated slices. The time required to denature the enzymes was determined by a blanching test. The slices made from fresh peeled potatoes were blanched in boiling water for four minutes. The blanched slices were then sulfited in an aqueous solution. The drained slices were dehydrated in a hot air cabinet dryer at 60° C. (140° F.) until the moisture content of the slices fell to less than 10%. The drying ratio and yield of dry product were recorded. The dehydrated slices were stored in high-density polyethylene bags until used. Crisps were prepared by frying the dehydrated slices using the frying conditions mentioned earlier.

The rehydration of dehydrated slices was carried out by soaking the dehydrated slices in water at room temperature and also in boiling water with and without 1–25% salt. The amount of water absorbed by the slices was recorded after intervals of 3, 5, 7, and 10 minutes. The rehydrated slices were fried under the standard conditions. Their quality was compared with that of crisps made from dehydrated slices and fresh slices.

In U.S. Pat. No. 3,660,113 a process is disclosed for producing potato chips in which the potato particles are frozen under such conditions that ice crystals form in the individual cells and rupture the cells due to the increase in size resulting from freezing of the water therein. Thereafter potato particles are thawed in warm water and the cell contents released upon cell rupture and thereafter the particles are fried at a temperature in the range of from about 176° C. to about 190° C. (about 350° F. to about 375° F.).

In U.S. Pat. No. 5,302,410, a process is disclosed for preparing frozen parfried potato strips which remain crisp for an extended period of time after finish frying. In this process, potatoes are cut into strips and blanched and then contacted with an aqueous solution containing a hydrolyzed starched product. After contact with the aqueous solution, the potato strips are parfried and frozen and are prepared for consumption by finish frying.

The strips have a width and a thickness from about 6.35 mm to about 12.7 mm and are several inches in length. After cutting, the strips are washed to remove the surface starch and then the strips are blanched by emersion in hot water in the range from about 87° C. to 115° C. (about 160° F. to 210° F.) for 2 to 15 minutes, or with a temperature range of from about 71° C. (170° F.) to about 88° C. (190° F.) for 4 to 10 minutes being preferred. The crispness and rigidity of the finished fried potato strips are improved by contacting the blanched strips, before parfrying, with an aqueous solution containing a hydrolyzed starch product. After contact with the aqueous solution the potato strips are drained and preferably partially dehydrated to reduce their moisture content. For example the potato strips are subjected to heated air having a temperature in the range of from about 65° C. (150° F.) to about 175° C. (350° F.) for from about 5 to 20 minutes in order to reduce the moisture content of the strips to the point at which the strips have lost about 5% to 25% of their initial weight. The partially dehydrated strips are then parfried by immersing them in a deep fat fryer for a short period of time, for example, 20 to 90 seconds at a fat temperature in the range of from about 162° C. (325° F.) to about 200° C. (390° F.). Parfrying removes additional moisture from the strips so that upon completion of parfrying, the potato strips have solids content of between 30% 40% which is equivalent to approximately 60%–70% moisture. After parfrying, the potato strips are frozen, packaged, and shipped or stored for subsequent use. To prepare the parfried strips for consumption, they are finish fried in deep fat or oil bath at a temperature in the range of from about 150° C. (300° F.) to about 190° C. (375° F.) for 1.5 to 3.5 minutes to develop color and crispness.

In U.S. Pat. No. 5,206,048, the raw potato slice, after being washed, is dipped in a chemical solution for 3 to 5 minutes and is then rapidly frozen at –40° C. (–40° F.) for 5 to 30 minutes. Thus, the raw potato slices used in this process are chemically treated before being frozen. The raw potato slice is then stored at approximately –20° C. (–4° F.) and, in the second stage, is then thawed at 30° C. to 80° C. (86° F. to 176° F.). The potato chip is then prepared by frying the potato at 170° C. to 190° C. (338° F. to 374° F.) for 1.5 minutes.

In U.S. Pat. No. 3,660,113, the potatoes are simply peeled, washed, sliced, and are then frozen raw. Immediately after freezing, the frozen slices were immersed in warm water at a temperature between about 32° C. and about 49° C. (90° F. and 120° F.) for from 1 to 3 minutes sufficient to thaw the potatoes. After thawing, the slices were then fried. Thus, the disclosure does not concern itself with preparing potatoes for long-term storage before being prepared for commercial use.

U.S. Pat. No. 4,254,153 concerns a two-stage potato processing system which requires two drying steps and a blanching step—the product is then parfried and frozen.

In U.S. Pat. No. 4,632,838 also relates to a two-stage potato chip process in which there is a chemical treatment of the potato slices, then blanching, then a drying step, and then two parfry steps before freezing.

In U.S. Pat. No. 4,761,294, concerning a two-stage potato chip process, the potato slices are water blanched, dried, parfried, frozen once, then subjected to hot air impingement for six minutes and then frozen a second time.

In U.S. Pat. No. 4,900,576, a two-stage potato process is disclosed in which there is a blanching of the potato particles, a chemical treatment of the potato slices, two parfry steps, and two freeze steps. The first parfry occurs before the first freeze, which is a quick freeze, then the particles are thawed, parfried the second time, and then given a final quick freeze.

Currently, potato chips are generally produced in a one-step frying process by frying slices (approximately 80% moisture) to a moisture content of less than 2%. The frying process can be continuous or batch. For a commercial process carried out at a number of locations, this involves transporting raw potatoes, sometimes over long distances, from the locations where they are grown to the sites where the potato chips are made. At each site, a number of processing steps are involved and they are: potato storage, potato washing, peeling, paring and trimming, slicing, washing, and frying to a specific finished product moisture. The potato chips are then salted and bagged and delivered to commercial locations for sale. At each of the different locations, all of the processing steps are basically duplicated to produce commercially available potato chips.

Those potato products that are prepared by a two-stage process are chemically treated and have two or more freezing steps or two or more frying steps in the first stage of the process. It is clear from the cited references that there is no commercially acceptable process existing for forming or producing frozen potato chips that can subsequently be fried for commercial use. All of the references relating to french fry potatoes use potato segments that are quite thick and wide and that have a large moisture content when frozen and eventually when fried also contain high moisture content.

It would be ideal to have a commercially viable process for producing potato chips, in two stages, that does not involve chemicals, either pre- or post-treatment. The initial stage would be continuous and would include washing, peeling, paring and trimming, slicing, washing, reducing the chips to a specific half-product moisture, and then freezing the product. The frozen product can then be stored in a cold warehouse for extended periods of time, up to several months. In the second stage, which would also be continuous, the frozen product is finish fried to a required moisture level, seasoned and bagged for distribution. With such a system, a large central location could be situated near the potato fields and utilized to produce an initial half-product that is stored for later distribution to a number of finishing plants. The potential advantages of such a process are in reduced freight costs of potatoes, reduced water and sewage costs, ability to convert waste products into high value by-products, and to provide consistent feedstock to the finishing fryer to produce high-quality finished products all year round. In addition, the expensive equipment used during the first stage could be located at one site near the potato source. The second stage apparatus is less expensive and can be situated at a number of sites where the finished chips are fried, salted, and bagged for distribution to commercial sources. Thus, equipment costs would be substantially reduced.

SUMMARY OF THE INVENTION

The present invention overcomes the disadvantages of the prior art by providing a dual-stage potato chip continuous process in which potato slices are partially dehydrated and then frozen for extended periods of storage. The potato slices may be flat, ruffled, ridged, or rippled, crosscut, or the like. As needed, the frozen slices are transported to the sites where the potato chips are finish fried continuously. The first stage is a continuous process for preparing the potato slices for indefinite storage. This stage is carried out at a site near the source of potatoes.

In the preferred embodiment, the potatoes are sliced to a desired thickness, washed to remove surface starch, fried to reduce the moisture content to an amount in the range of about 3% to 30%, frozen, and then stored until ready for use. When ready for commercial use, the frozen potato slices are transported to remote sites where a second stage continuous process prepares the potato slices for commercial use by finish frying the frozen potato slices to form potato chips, seasoning, and bagging the potato chips for consumer use.

In another embodiment, the potatoes are again sliced to a desired thickness, washed to remove surface starch, blanched to deactivate enzymes in the potato slices, dried to reduce the moisture content to an amount a preferred range of 25% to 35%), frozen, and then stored until ready for use.

Thus, it is an object of the present invention to provide a dual-stage potato chip continuous process for preparing potato chips in which the first stage is a continuous process for preparing potato slices for indefinite storage and the second stage is a continuous process that prepares the potato chips for commercial use at any one of a plurality of locations.

It is another object of the present invention to provide a dual-stage potato chip process in which, prior to freezing, the raw potato slices are partially fried.

It is a further object of the present invention to provide a dual-stage potato chip process in which, prior to freezing, the raw potato slices are partially dried.

Thus, in the preferred embodiment, the present invention relates to a dual-stage process for preparing potato chips comprising the steps of centralizing a first stage continuous process for preparing potato slices for indefinite storage and having a second stage process for preparing the stored potato slices into potato chips for a consumer. In the first stage continuous process of the preferred embodiment, the potatoes are peeled and sliced to a thickness in the range of from about 1.3 mm to about 2.8 mm. The potato slices are then washed to remove surface starch thereon. The washed potato slices are fried at a temperature in the range of from about 171° C. to 182° C. (about 340° F. to about 360° F.) for a time period in the range of 50 to 180 seconds to reduce the moisture content of the potato slices to an amount in the range of about 3% to 30%. The potato slices are then frozen for a time period in the range of 1 to 6 minutes at a temperature in the range of about −10° C. to −30° C. (about 14° F. to −22° F.). After freezing, the frozen potato slices are stored at a temperature of −18° C. (0° F.) for an extended period of time up to several months.

In the alternative process, the partially dried process, the present invention comprises the steps of centralizing a first stage continuous process for preparing potato slices for indefinite storage and having a second stage process for preparing the stored potato slices into potato chips for a consumer. In the first stage of the alternate continuous process the potatoes are peeled and sliced to a thickness in the range of 1.3 mm to 2.8 mm. The slices are then blanched to deactivate the enzymes. If steam is used, the blanching process is carried out for 2 to 50 seconds at a temperature of about 121° C. to about 138° C. (about 250° F. to about 280° F.). The preferred temperature of steam is 121° C. (250° F.) with the preferred water temperature of 82° C. (182° F.). If water is used, the process is carried out for 2 to 4 minutes at a temperature range of about 71° C. to about 88° C. (160° F. to about 190° F). The blanched potato slices are dried at a temperature in the range of about 121° C. to about 135° C. (about 250° F. to about 275° F.) for a period of 2 to 12 minutes to reduce the moisture content of the potato slices to an amount in the preferred range of 25% to 35%. The potato slices are then frozen for a time period in the range of 1 to 6 minutes at a temperature in the range of about −10° C. to −30°C. (about 14° F. to −22° F.). After freezing, the frozen potato slices are stored at a temperature in the range of about −18° C. (0° F.) for an extended period of time.

In the second stage continuous process, the frozen potato slices are shipped to a plurality of locations where they are fried for a time period in the range of about 15 to 45 seconds at a temperature in the range of about 160° C. to about 170° C. (about 320° F. to about 345° F.) to form potato chips with moisture varying from 1.1% to 1.6%. They are then bagged for consumer use.

BRIEF DESCRIPTION OF THE DRAWINGS

These and other objects of the present invention will be more fully disclosed when taken into conjunction with the following DETAILED DESCRIPTION OF THE DRAWINGS in which:

FIG. 1 illustrates the process steps for the first stage of the preferred dual-stage potato chip process that involves frying the raw potato slices;

FIG. 2 illustrates a portion of the first stage of the preferred dual-stage potato chip process in which an additional step is provided;

FIG. 3 also illustrates a portion of the first stage of the preferred dual-stage potato chip process in which still another optional step is shown;

FIG. 4 illustrates the process stages for the first stage of the alternate dual-stage potato chip process that involves drying the raw potato slices; and FIG. 5 illustrates the second stage of the dual-stage potato chip process which is common to both the preferred and alternate embodiments and in which the potato chips are fried, seasoned, and packaged.

DETAILED DESCRIPTION OF THE PREFERRED EMBODIMENTS

Consider, now, the preferred embodiments shown in FIG. 1 which relate to frying the raw potato slices.

In preparing the potatoes at step 10, the potato varieties used are those normally used for potato chips such as Snowden or Atlantic. They typically have solids in the range of 15.0% to 22.0% and are under 5 inches in diameter. At step 12, the potatoes are peeled in a typical manner by abrasive peeling to remove at least 85% of the peel. A continuous roller type peeler, well known in the art, may be used. At step 14, the potatoes are sliced to a substantially uniform thickness in the range of 1.3 mm to 2.8 mm. An Urschel Model CC slicer, well known in the art, may be used. The slices are then washed in a well-known manner to remove the surface starch thereon. In this process, the slices do not have to be blanched to deactivate enzymes.

At step 16, the potato slices are fried at a temperature in the range of about 171° C. to about 182° C. (about 340° F. to about 360° F.), with the preferred range being about 174° C. to 179° C (about 345° F. to about 355° F.), for a time period in the range of about 50 to 180 seconds, with the preferred range being from about 70 to 90 seconds to reduce the moisture content of the potato slices to an amount in the range of about 3% to 30% and preferably to about 10% to 15%. A typical continuous-type fryer well known in the art may be used. At step 18, the potato slices are quick frozen for a time period in the range of about 1 to 6 minutes in a temperature range of from about −10° C. to −30° C. (about 14° F. to −22° F.). Optionally, the potato slices may be slowly frozen for a time period of 20 to 60 minutes, with the preferred time being 50 minutes, at about 0° to −18° C. (about 32° F. to 0° F.). The frozen potato slices are then stored at a temperature of −18° C. (0° F.) for an extended period of time up to several months.

FIG. 2 illustrates the addition of an optional step to the first stage process illustrated in FIG. 1. As can be seen in FIG. 2, a low oil chipper (LOC) 22, a well-known device, is inserted after the frying stage 16 to reduce oil spotting and oil content in the finished fried product. It operates with the following conditions: 30% steam, 5% oxygen, and 40 seconds of dwell time at a temperature in the range of about 88° C. to about 124° C. (about 190° F. to about 255° F.). After the oil-removing step 22, the potato slices are then frozen at step 18 as previously indicated in relation to FIG. 1. FIG. 3 illustrates yet another optional step in the process of FIG. 1 wherein the step of tempering the potato slices at step 24 is inserted before the freeze step 18 and the packaging/storing step 20. The fried potato slices after step 16 at step 24 are tempered for a time period in the range of about 1 to 60 minutes at room temperature to assist in causing uniform moisture distribution in the fried potato slice. During the frying of the potato chip at step 16, moisture is removed from the outer surface areas first, with the highest moisture levels remaining in the center of the slices. As the slices spend more time in the fryer, further moisture diffuses from the slice center to the outer surfaces of the slice. If the potato slice is tempered, allowed to sit after frying, the remaining moisture tends to be equilibrated throughout the fried slice. After the tempered potato slices are frozen, packaged, and stored, they may, at any time up to several months, be shipped at step 26 from the central location where they are stored to any one of a plurality of sites at remote locations for finish frying of the product during the second stage.

The first three steps in the alternate process shown in FIG. 4 are identical to steps 10, 12, and 14 of the process of the preferred embodiment. The potatoes typically used are the Snowden or Atlantic variety having solids in the range of from about 15.0% to about 22% and are under 5 inches in diameter. The potatoes are peeled in a typical manner and, again, are sliced in a well-known manner to a substantially uniform thickness in the range of from about 1.3 mm to about 2.8 mm. The slices are then washed in a well-known manner to remove the surface starch thereon.

At step 15 in FIG. 4, the enzymes must be and are deactivated to reduce browning of the potato slices. Either steam blanching or water blanching can be used.

If steam blanching is used, the raw potato slices are steamed at a temperature in the range from about 120° C. to about 138° C. (about 250° F. to about 280° F.) for a time period in the range of from about 2 to 50 seconds. The preferred temperature of the steam is 121° C. (250° F.).

If water blanching is used, the raw potato slices are placed in water having a temperature in the range of from about 71° C. to about 88° C. (about 160° F. to about 190° F.) for a time period in the range of about 2 minutes to about 4 minutes. The preferred water temperature is about 82° C. (180° F.). It is important that the blanching water not be boiling water as in such case nutrients are removed from the raw potato slices.

The raw blanched potato slices are then dried with heated air in the temperature range of from about 121° C. to about 135° C. (about 250° F. to about 275° F.) for a time period in the range of from about 2 to 12 minutes to reduce the moisture content of the potato slices to an amount in the preferred range of about 25% to about 35%.

The partially dried potato slices are then frozen and stored as explained previously.

FIG. 5 illustrates the steps of the second stage in which, once again, the frozen potato slices may be allowed to temper at step 28. This, again, allows equilibration of the moisture throughout the potato slice. They are then fed on a conventional feed conveyor 30 as a monolayer into the fryer 32 where they are fried for a time period in the range of 15 to 45 seconds at a temperature in the range of about 160° C. to 179° C. (about 320° F. to 355° F.) to form potato chips having a moisture content in the range of from about 1.0% to 1.6%. They are then salted or seasoned at step 34 in the usual manner and packaged at step 36 in a well-known manner for consumer use.

The chipping potatoes used for potato chips are low in reducing sugars and are generally not used for french fries or baked potatoes. The common varieties of chipping potatoes are Atlantic, Monona, Norchip, Snowden, and other proprietary varieties grown for exclusive use of the potato chip manufacturer.

Thus there has been disclosed a dual-stage potato chip process for producing potato chips in two continuous process stages. The initial stage involves partially frying slices to approximately 3% to 30% moisture (or alternatively, partially drying the potato slices as set forth earlier), and then freezing this product in the range of from about −10° C. to −30° C. (about 14° F. to −22° F.). The frozen product is then stored in a cold warehouse for extended periods of time. In the second stage, the frozen product is finish fried to a desired moisture content. A large central location situated near the potato fields can be utilized to produce the initial half product during the first stage of the continuous process and the resulting potato slice is stored for later distribution to a number of finishing plants where, during the second stage of the continuous process, the potato chips can be finished and bagged. The potential advantages of this process are in reduced freight costs of potatoes, reduced water and sewage costs and the ability to convert waste products into high value added by-products. In addition, this dual-stage process provides consistent feedstock to the finishing fryer to produce high-quality finished products all year-round.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A dual-stage process for preparing potato chips consisting essentially of the steps of:

a first stage continuous process for preparing potato slices at a first location for indefinite storage comprising the steps of:
  slicing peeled potatoes to a thickness in the range of about 1.3 mm to about 2.8 mm;
  washing said potato slices to remove surface starch thereon;
  frying said washed potato slices for a time period sufficient to reduce the moisture content of the potato slices to about 3% to 30%; freezing said potato slices; and
  storing said frozen potato slices at a temperature of −18° C. (0° F.) for an extended period of time; and
a second stage coutinuous process for preparing potato chips for consumer use comprising the steps of:
  shipping said frozen potato slices to a plurality of second locations;
  frying said frozen potato slices at each one of the plurality of second locations for a time period sufficient to form potato chips; and
  bagging said potato chips for consumer use.

2. A process as in claim 1 further including the step of frying said washed potato slices at a temperature in the range of about 171° C. to about 182° C. (about 340° F. to about 360° F.).

3. A process as in claim 2 further including the step of frying said washed potato slices at a temperature in the range of about 171° C. to about 182° C. (about 340° F. to about 360° F.) for a time period in the range of about 50 to about 180 seconds.

4. A process as in claim 3 wherein the preferred time period for frying said potato slices is the range of 70 to 90 seconds at a temperature in the range of about 171° C. to about 182° C. (about 340° F. to about 360° F.).

5. A process as in claim 4 wherein the preferred temperature for frying said potato slices is in the range of about 174° C. to about 179° C. (about 345° F. to about 355° F.).

6. A process as in claim 1 further including the step of frying said washed potato slices at a temperature in the preferred range of about 174° C. to about 179° C. (about 345° F. to about 355° F.).

7. A process as in claim 1 further including the step of tempering said fried potato slices before freezing for a time period in the range of about 1 to 60 minutes at room temperature to cause uniform moisture distribution in the fried potato slice.

8. A process as in claim 1 further including the step of fast freezing said potato slices for a time period in the range of about 1 to 6 minutes at a temperature in the range of about −10° C. to about −30° C. (about 14 ° F. to about −22° F.).

9. A process as in claim 1 further including the step of slow freezing said potato slices for a time period in the range of about 20 to 60 minutes at a temperature in the range of about 0° C. to about −18° C. (about 32° F. to about 0° F.).

10. A process as in claim 8 wherein the preferred time for slow freezing said potato slices is 50 minutes in the range of about 0° C. to about −18° C. (about 32° F. to about 0° F.).

11. A process as in claim 1 further including the step of storing said frozen potato slices at a temperature range of about −18° C. (0° F.).

12. The process of claim 1 wherein said potato slices are fried during said first stage continuous process to reduce the moisture content to a preferred range of 5%–15%.

13. The process of claim 1 further including the step of frying said frozen potato slices during said second stage continuous process at each of said plurality of second locations at a temperature in the range of about 160° C. to about 179° C. (about 320° F. to about 355° F.) for a period of time in the range of about 15 to 45 seconds to achieve a moisture level in the range of about from 1.1% to 1.6%.

14. A continuous process for preparing potato slices for storage until ready for potato chip production by trying and bagging, the process consisting essentially of the steps of:
  slicing peeled potatoes to a thickness in the range of 1.3 mm to 2.8 mm;
  washing said potato slices to remove surface starch therefrom;
  frying said washed potato slices for a time period sufficient to reduce the moisture content of the potato slices to about 3% to about 30%;
  freezing said potato slices; and
  storing said potato slices until ready for frying to form said potato chips.

15. A continuous process as in claim 14 wherein said washed potato slices are fried at a preferred temperature range of about 171° C. to about 187° C. (about 340° F. to about 360° F.).

16. A continuous process as in claim 14 further including the step of frying said washed potato slices at a temperature range of about 171° C. to about 187° C. (about 340° F. to about 360° F.) for a time period in the range of about 50 to 180 seconds to reduce the moisture content to a range of 3% to 30%.

17. A continuous process as in claim 14 further including the step of tempering said fried potato slices before freezing for a period to time in the range of about 1 to 60 minutes at room temperature.

18. A continuous process as in claim 14 further including the step of freezing said potato slices for a time period in the range of about 1 to about 6 minutes at a temperature in the range of about −10° C. to about −30° C. (about 14° F. to about −22° F.).

19. A continuous process as in claim 18 further including the step of storing said frozen potato slices at a temperature range of about −18° C. (0° F.) until ready for frying to form said potato chips.

20. A dual-stage process for preparing potato chips consisting essentially of the steps of:
  a first stage continuous process for preparing potato slices at a first location for indefinite storage comprising the steps of:
    slicing peeled potatoes to a thickness in the range of about 1.3 mm to about 2.8 mm;
    washing said potato slices to remove surface starch thereon;
    deactivating enzymes in said potato slices;
    drying said potato slices with heated air for a time period until the slices have a moisture content in the range of about 25% to 35%;
    freezing said dried potato slices; and
    storing said frozen potato slices until ready for use; and
    a second stage continuous process for preparing potato chips for commercial use at any one of a plurality of second locations remote from the first location comprising the steps of:
      frying said frozen potato slices at each one of said plurality of second locations for a time period sufficient to form potato chips; and
      bagging said potato chips for consumer use.

21. A dual-stage process for preparing potato chips as in claim 20 wherein said potato slices are dried with heated air in the temperature range of about 121° C. to about 135° C. (about 250° F. to about 275° F.).

22. A dual-process for preparing potato chips as in claim 21 wherein said potato slices are dried with heated air in the temperature range of about 121° C. to about 135° C. (about 250° F. to about 275° F.) for a time period in the range of 2 to 12 minutes.

23. A process as in claim 20 wherein the step of deactivating enzymes in said potato slices further comprises the step of blanching said washed potato slices with steam for a time period of 2 to 50 seconds at a temperature in the range of about 121° C. to about 138° C. (about 250° F. to about 280° F.).

24. A process as in claim 23 wherein the preferred temperature for blanching said washed potato slices with steam is 121° C. (250° F.).

25. A process as in claim 20 wherein the step of deactivating enzymes in said potato slices further comprises the step of blanching said washed potato slices with water for a 2 to 4 minute period of time at a temperature in the range of about 71° C. to about 88° C. (about 160° F. to about 190° F.).

26. A process as in claim 25 wherein the preferred temperature for blanching said washed potato slices with water of about 82° C. (180° F.).

27. A process as in claim 20 wherein the step of freezing said dried slices further comprises the step of fast freezing said dried potato slices for about 1 to 6 minutes at a temperature in the range of −10° C. to −30° C. (14° F. to −22° F.).

28. A process as in claim 27 wherein the step of freezing said dried slices further comprises the step of slow freezing said dried potato slices for 20 to 60 minutes at a temperature in the range of about 0° C. to about −18° C. (about 32° F. to about 0° F.).

29. A process as in claim 28 wherein the preferred time for slow freezing said slices is 50 minutes in the range of 0° C. to −18° C. (32° F. to 0° F.).

30. A continuous process for preparing potato slices for indefinite storage consisting essentially of the steps of:

slicing peeled potatoes to a thickness in the range of about 1.3 mm to about 2.8 mm;

washing said potato slices to remove surface starch thereon;

deactivating enzymes in said potato slices;

drying said potato slices with heated air for a time period until the slices have a moisture content in the range of about 25% to 35%; freezing said potato slices; and storing said frozen potato slices until ready for use.

* * * * *